United States Patent
Afeltra

(10) Patent No.: US 8,046,900 B2
(45) Date of Patent: Nov. 1, 2011

(54) PROCESS FOR MANUFACTURING A LIGHT ALLOY WHEEL RIM AND WHEEL RIM RESULTING THEREFROM

(75) Inventor: Umberto Afeltra, Dello (IT)

(73) Assignee: Hayes Lemmerz S.r.l., Dello, Brescia (IT)

( * ) Notice: Subject to any disclaimer, the term of this patent is extended or adjusted under 35 U.S.C. 154(b) by 838 days.

(21) Appl. No.: 10/592,133

(22) PCT Filed: Apr. 23, 2004

(86) PCT No.: PCT/IT2004/000230
§ 371 (c)(1),
(2), (4) Date: Jun. 27, 2007

(87) PCT Pub. No.: WO2005/102737
PCT Pub. Date: Nov. 3, 2005

(65) Prior Publication Data
US 2007/0278849 A1    Dec. 6, 2007

(51) Int. Cl.
*B21B 1/46* (2006.01)
(52) U.S. Cl. ..... 29/527.6; 29/527.5; 29/557; 29/894.35; 29/894.32
(58) Field of Classification Search ............... 29/527.5, 29/527.6, 557, 894.3, 894.35, 894.351, 894.353, 29/894.32, 894.323
See application file for complete search history.

(56) References Cited

U.S. PATENT DOCUMENTS

| | | | |
|---|---|---|---|
| 1,792,051 A * | 2/1931 | Valentine | 72/349 |
| 2,977,669 A * | 4/1961 | Chambers | 29/90.01 |
| 5,361,493 A * | 11/1994 | Baldi | 29/894.324 |
| 6,244,668 B1 | 6/2001 | Hale, Jr. et al. | |
| 2002/0003373 A1 | 1/2002 | Hale, Jr. et al. | |

FOREIGN PATENT DOCUMENTS

WO    WO 98/47723 A    10/1998

OTHER PUBLICATIONS

"Burnishing" eFunda from Sep. 29, 2009.*
International Search Report dated Jan. 24, 2005 for International Patent Application No. PCT/IT2004/000230.

* cited by examiner

*Primary Examiner* — David Bryant
*Assistant Examiner* — Jacob Cigna
(74) *Attorney, Agent, or Firm* — MacMillan, Sobanski & Todd, LLC

(57) ABSTRACT

Process (20) for manufacturing a wheel rim (1) in light alloy including the following operations: providing (21) a rough wheel rim in light ally, comprising a wheel disc (2) and an annular portion (3), the annular portion (3) including a first (4I) and a second (4e) bead defining a drop well (C) having a first profile; processing (23) the rough wheel rim, modifying the first profile in order to obtain a second profile being of a lower thickness than the first profile, at least at an intermediate portion (C1) of the drop well (C), characterized by including a finishing operation (25) of a surface of the second profile intermediate portion by means of a compression action of said surface, the finishing operation leaving the low thickness substantially unchanged.

21 Claims, 6 Drawing Sheets

PROCESS FOR MANUFACTURING A LIGHT ALLOY WHEEL RIM AND WHEEL RIM RESULTING THEREFROM

The present invention relates to the technical field of vehicle wheels, and particularly to a process for manufacturing a light alloy wheel rim and a wheel rim resulting from said process.

The weight of a wheel rim is known to influence in an appreciable way the performance and fuel consumption of the vehicle on which it is mounted.

In order to resolve or reduce the drawbacks due to this problem various types of light alloy (for example made in aluminium) wheel rims are available. Light alloy wheel rims, or alloy rims are of a lower weight than other types of rim.

Typically an alloy wheel rim comprises a portion having a substantially annular shape and further comprises a wheel disc joined to this annular portion. The annular portion comprises a region, denominated the drop well, suitable to couple with a tyre.

For example, the wheel disc and the annular portion are formed by casting in a single piece or alternatively they are made by casting as two separate pieces subsequently united, e.g. welded, to one another.

The wheel disc comprises a hub and a flange connected to one another through spokes and it is exposed towards the outside of the motor vehicle, thus allowing to obtain an aesthetic effect of considerable prestige.

Different solutions have been proposed in recent years in order to reduce the weight of alloy rims.

For example, lightening techniques have been developed that supply alloy rims provided in their structure with lightening recesses or cavities or pockets. Rims of this type are for example described in U.S. Pat. No. 6,135,367 B1 and international patent application WO 98/47722. The weight reduction of the wheel rim obtained through such lightening techniques, although appreciable, entails however an increase in the structural complexity of the wheel rim and a corresponding significant increase in the complexity of the manufacturing process.

Another possibility for lightening alloy wheel rims is that of making alloy rims having a drop well thinner than the other regions of the wheel rim.

However it has been observed that too thin a drop well, due to porosities or micro-cavities optionally introduced therein in the production step, may present certain air-permeable regions. Due to the presence of such regions an undesired deflating of the tyre installed on the wheel rim may occur.

In the past manufacturing methods have been proposed that, in order to reducing possible air loss through the drop well section, provide a heat deposition operation on the drop well of a high density material in order to seal any micro-openings or passages in the drop well section. One particular example of such methods is described in U.S. Pat. No. 5,569, 496.

These methods however have limited efficiency and further have the drawback of requiring very thorough cleaning of the wheel rim surface, to be performed prior to the heat deposition operation, in order to ensure a uniform and correct adhesion of the thermally deposited material thereto.

The object of the present invention is to provide a process for the manufacture of a light alloy wheel rim able to overcome the disadvantages of the state of the art described above.

This object is achieved by a process for the manufacture of a light alloy wheel rim as described in the appended first claim. Preferred embodiments of the manufacturing process according to the invention are defined by dependent claims 2-19.

A further object of the present invention is a light alloy wheel rim such as described in the appended claim 20.

Further characteristics and the advantages of the invention will be better understood from the following detailed description of a preferred embodiment thereof, which is given as a non-limiting example relating to the appended figures, wherein.

In the figures equal or similar elements are indicated by the same numerical references.

The term wheel rim rotation axis means the axis around which it is destined to rotate in use.

The term radial direction means a direction which is substantially perpendicular to the wheel rim rotation axis.

The term axial direction means a direction which is substantially parallel to the wheel rim rotation axis.

Figure 1:
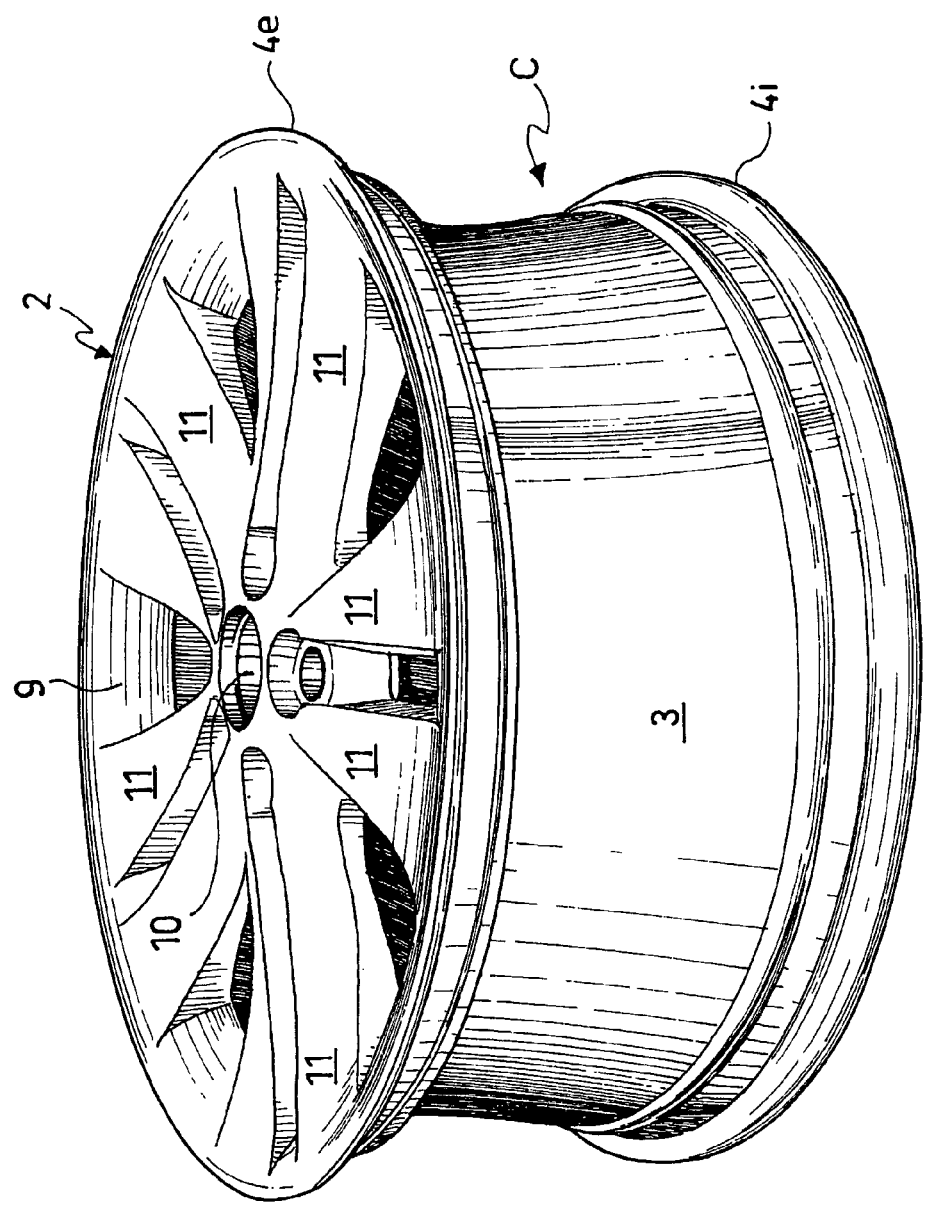
FIG. 1 shows a perspective view of a light alloy wheel rim for automobile.

With reference particularly to FIG. 1, a light alloy wheel rim 1 (for example, in aluminium) is illustrated, for example of the type that can be used in an automobile wheel.

The wheel rim includes a wheel disc 2 and a annular portion or ring 3. The latter comprises a first bead 4$i$ or inner bead and a second bead 4$e$ or outer bead extending in a substantially radial direction each one along a respective circumference of the ring 3. The beads 4$i$ and 4$e$ are arranged at two axially opposite sides of the ring 3 and are arranged in an inner and an outer position respectively when the wheel rim 1 is assembled on the automobile. The inner bead 4$i$ and the outer bead 4$e$ of ring 3 define a coupling drop well C, in order to couple the wheel rim 1 to a tyre, for example of the tubeless type, not represented in FIG. 1.

The wheel disc 2 of the wheel rim 1 in the vicinity of the outer bead 4$e$ comprises a flange 9 extending towards the inside of the ring 3; the flange faces outwards when the wheel rim is assembled on the automobile and contributes to defining the aesthetic appearance of the wheel rim 1.

A hub 10 is used to connect the wheel rim 1 to an automobile axle (not shown in the figure).

The wheel disc 2 further includes a plurality of spokes 11 suitable to connect the ring 3 to the hub 10 in the vicinity of the flange 9. In greater detail, each spoke 11 extends substantially radially between the ring 3 and the hub 10.

Figure 2:
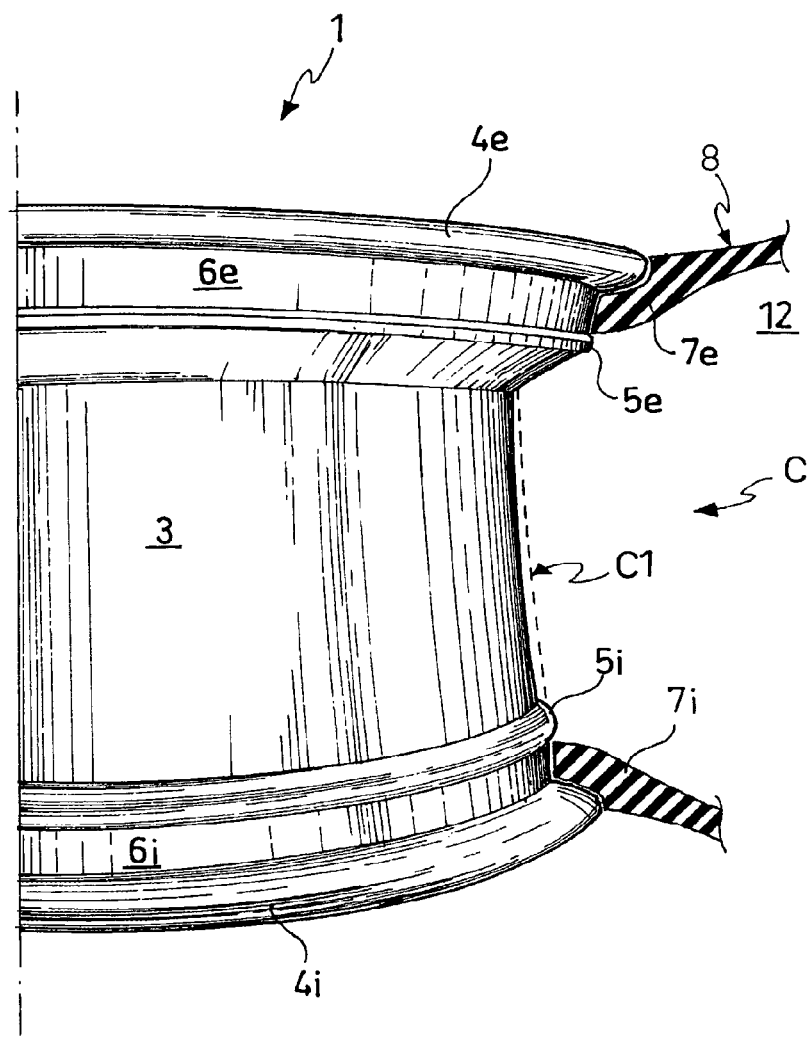
FIG. 2 shows a partial side view of an enlarged detail of the wheel rim of FIG. 1.

FIG. 2 represents in a partial side view an enlarged detail of the wheel rim of FIG. 1. A first hump 5$i$ or inner hump and a second hump 5$e$ or outer hump protrude from an inner surface of the drop well C in the vicinity of the inner bead 4$i$ and of the outer bead 4$e$ respectively. The inner hump 5$i$ and the outer hump 5$e$ comprise a respective active surface of the drop well C, indicated with 6$i$ and 6$e$ respectively.

The tyre 8 terminates with beads 7$i$ and 7$e$ which are suitable to cooperate hermetically with the respective active surfaces 6$i$ and 6$e$ and the respective beads 4$i$ and 4$e$ in order to anchor the tyre 8 to the wheel rim 1, thus maintaining the correct inflation pressure of the same (even without the use of a tube).

While a particular example of wheel rim 1 has been described with reference to FIG. 1, the considerations exposed below also apply to different types of rims and particularly they are also valid in the case in which the wheel rim is used in a different type of vehicle (for example, a motorcycle), is made in a different material (such as magnesium or titanium, or more generally any light alloy suited to the making of rims), has a different form, for example it includes humps having a different form (for example, they are extended humps).

Also with reference to FIG. 2, it should be observed that the portion of the drop well C included between the first 6*i* and the second 6*e* active surface defines together with the inner surface of the tyre 8 an inner tube 12 suitable to contain a pressurised gas so as to support the tyre itself. It should be highlighted that the term inner tube 12 means a substantially toroidal chamber suitable to contain a pressurised gas.

Advantageously, the wheel rim 1 presents at least one intermediate portion of the drop well C with a low-thickness section (for example substantially less than 4 millimetres) and presents any porosities and/or micro-lesions and/or micro-cavities, sealed by means of a surface mechanical processing of such intermediate portion, so as to prevent a passage of air through the drop well section. Preferably, such thickness is less than 3.5 millimetres. More preferably, this thickness is comprised within the range from 2.5 millimetres to 3 millimetres.

Throughout the present description, by intermediate portion is meant a portion between the first bead 4*i* and the second bead 4*e*, including a substantially central region of the drop well C and not necessarily arranged in a symmetrical way to said substantially central region.

With reference to FIG. 2, in a particularly preferred embodiment the low-thickness intermediate portion of the drop well C is comprised between the first active surface 6*i* and the second active surface 6*e* of the drop well C; preferably, it is comprised between the inner hump 5*i* and the outer hump 5*e* of the drop well C.

In a particularly preferred embodiment, the low-thickness intermediate portion extends substantially along the entire stretch of the drop well C between the two humps, for example it extends along the dotted line indicated in FIG. 2 with the reference C1.

With reference to the block diagram represented in FIG. 2, a particularly preferred embodiment of a manufacturing process or method 20 of an alloy wheel rim 1 in accordance with the present invention will be described below.

The manufacturing process 20, includes a first operation of supplying 21 (CAST_RIM) a rough wheel rim, for example of the integral type, i.e. in a single piece. Rough wheel rim means a wheel rim that has approximately the shape and the dimensions of a definitive wheel rim but that needs further mechanical processing operations that typically provide a removal of material from the rough wheel rim (i.e. roughing operations) and are essentially aimed at refining the wheel rim profile in peripheral regions thereof.

Preferably, the operation of supplying 21 the rough wheel rim is such to produce a wheel rim comprising a drop well C having in the stretch between the first and the second hump a profile with a non-constant thickness section, for example substantially between 10 millimetres and 20 millimetres.

Preferably and non-limitingly, the operation of supplying 21 the rough wheel rim includes an in-die casting operation in which the cast material is aluminium or an alloy thereof.

The in-die casting operation is now state of the art and will therefore not be further detailed in the present description. For example, the in-die casting operation is of the "gravity" type or alternatively of the "low pressure" type.

The in-die casting operation further includes a step of removing the rough wheel rim from the die after suitable times, i.e. after a substantial solidification of the material poured into the die and preferably includes a subsequent step of cooling of the wheel rim, such as through the rapid immersion thereof in water.

In alternative, or in addition, to the in-die casting operation, the operation of providing 21 the rough wheel rim includes a casting operation. By casting operation is meant a processing operation of a preform of a wheel rim (for example, and not limitingly, obtained by in-die casting) in order to plastically deform such preform when hot.

Figure 3:
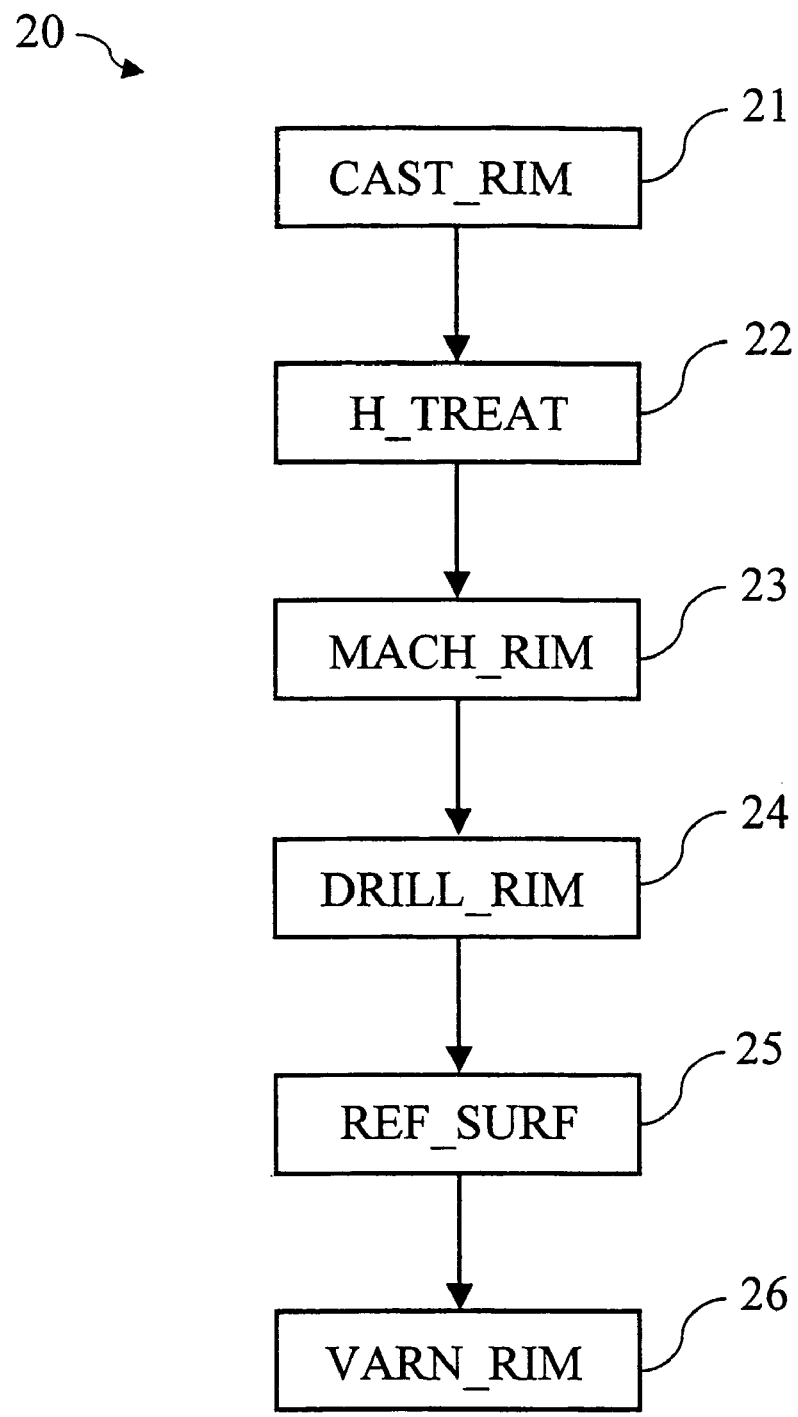
FIG. 3 shows a simplified diagram listing a succession of processing operations included in a manufacture method in accordance with the present invention.

As shown in the diagram in FIG. 3, the manufacturing process 20 includes, preferably, after the operation of providing 21 the rough wheel rim a subsequent optional operation of heat treatment 22 (H_TREAT), wherein the rough wheel rim is taken to a high temperature in order to improve the mechanical and structural properties thereof. In any case, this operation is optional as it may or may not be required according to the particular type of alloy used. For example, the heat treatment operation 22, if provided, includes the known steps of: solution heat-treatment, quenching and ageing and therefore not further described.

The manufacturing process 20 further comprises a subsequent mechanical processing operation 23 (MACH_RIM) in order to remove metal from the rough wheel rim. Preferably this process includes a turning operation.

For example, during this operation, the rough wheel rim is locked onto a rotating plate of a lathe and made to rotate around a rotation axis substantially coinciding with the rotation axis thereof. Known type cutting tools oriented substantially along a radial direction to the wheel rim whilst this is rotating are applied to the outer and/or inner surface of the wheel rim 1 in order to produce a removal of rough wheel rim material in order to obtain a wheel rim having a form that approximates in a substantial way the definitive form of the alloy wheel rim.

In greater detail, during the processing operation at the lathe 23 one or more cutting tools insist on the annular portion of the wheel rim 1 whilst this is rotating and are shifted axially to the wheel rim 1 in order to insist on separate regions of the annular portion. The cutting tools are now known to men skilled in the art, for this reason they will not be described more in depth in the present description.

Figure 4:
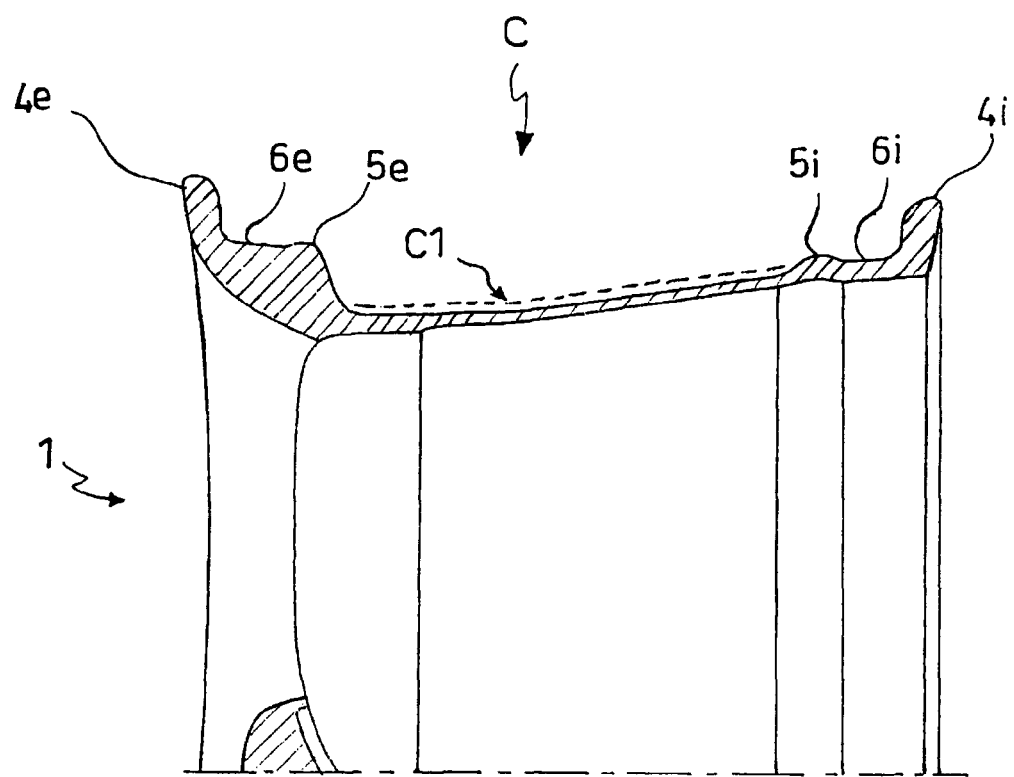
FIG. 4 shows a partial sectional view of the light alloy wheel rim represented in FIG. 1 on output from one of the processing operations of the diagram in FIG. 3.

Advantageously the mechanical processing operation 23 is such to produce a wheel rim 1 having a drop well C, for example such as represented laterally and in section in FIG. 4, with an intermediate section having a considerably low-thickness section compared to the thickness of the drop well C of the rough wheel rim.

Preferably the processing operation at the lathe 23 provides a wheel rim 1 in which an intermediate portion of the drop well C has a section with a thickness of less than 4 millimetres, and more preferably between 2.5 and 3.5 millimetres. For example, this intermediate portion extends in the stretch of drop well C between the inner hump 5*i* and the outer hump 5*e*. This stretch is indicated in FIG. 4 by dotted line C1.

In accordance with the diagram of FIG. 3, the manufacturing process 20 preferably includes, after the mechanical processing operation 23, a drilling operation 24 (DRILL_RIM) in which the wheel rim wheel disc is drilled to make the holes that allow the connection of the wheel rim with a motor vehicle axle.

Advantageously, the manufacturing process 20 includes a subsequent superficial finishing operation 25 (REF_SURF) of at least an intermediate portion of the surface of the drop well C of the wheel rim 1. This operation, is such as to not macroscopically modify the form and dimensions of the wheel rim 1, but it is such to act plastically on the surface of the drop well C in order to substantially seal any air-permeable porosities and/or holes in the drop well C in the operation of providing 21 the rough wheel rim.

Advantageously, the surface finishing operation 25 includes a superficial processing obtained through a number of local compression actions, i.e. respectively acting on areas limited by the drop well surface which is intended to be processed.

Particularly, this superficial finishing operation 25 includes a burnishing (that is polishing) operation. The burnishing operation is for example realisable by means of a tool including a local compression element of a smaller size than the surface to be processed and moved in relation to the wheel rim during this operation so as to beat one or more times the surface to be processed.

For example, the compression element is a little ball (or, similarly, a small cylinder), suitable to rotate on the surface of the drop well as a consequence of the relative motion between wheel rim and tool and made in a material with a far greater hardness than the typical hardness of the material of which the wheel rim 1 is made.

Advantageously, the local compression allows to obtain an even and homogeneous processing of the surface subject to such compression operation.

Any porosity is thus sealed by local deformation of the surface of the drop well C. Essentially, the burnishing operation is such to reduce the roughness of the surface of the drop well C and is preferably such to leave substantially the thickness of the section of the drop well C as the action thereof is performed substantially at a superficial level.

In a particularly advantageous embodiment, because simple from an implementation point of view, the burnishing operation is performed on the wheel rim 1 by one or more tools provided in the same lathe in which the processing operation at the lathe 23 (MACH_RIM) is performed. In this case the burnishing operation is performed by setting the wheel rim 1 rotating around the axis of rotation thereof and such to pass the burnishing tool one or more times on the portion of surface of the drop well C destined to be subject to burnishing.

Advantageously, the burnishing operation may be performed cold, i.e. it does not require the previous heating of the wheel rim 1.

Figure 5:
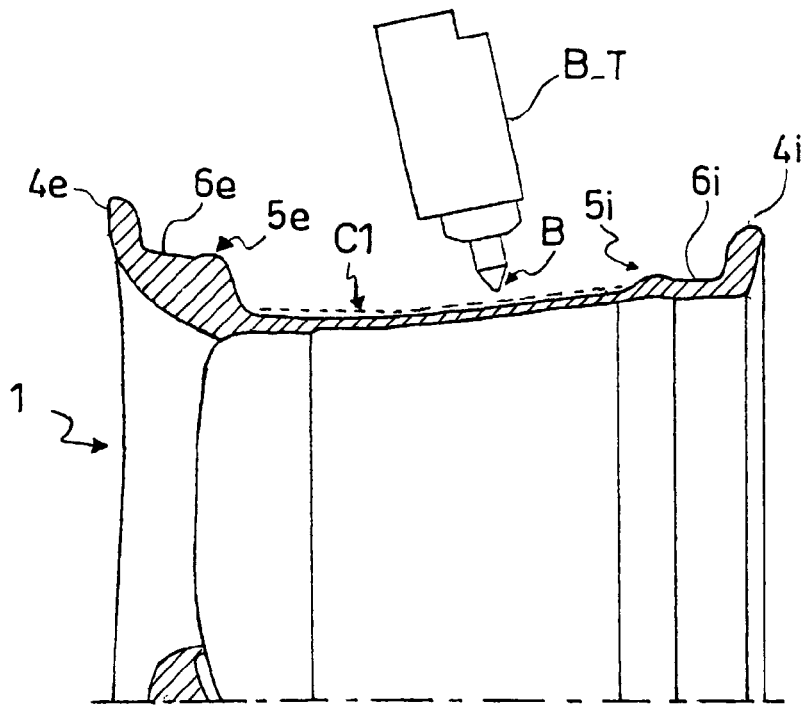
FIGS. 5, 6, 7 and 8 show a partial sectional view of the wheel rim represented in FIG. 1 during different embodiments of one of the processing operations of the diagram in FIG. 3.

FIG. 5 represents a partial side section view of the wheel rim 1 during the burnishing operation. In accordance with that presented in FIG. 5, in a particularly preferred embodiment the burnishing operation is such to process the entire surface of the drop well C facing to the outside of the wheel rim 1 and is substantially comprised between the inner hump 5i and the outer hump 5e.

In the figure the burnishing tool is indicated with reference B_T and includes a hard compression element B, such as a hard ball-shaped tip B. The portion of the surface of the drop well C to be subject to burnishing is indicated by dotted line C1; it should be noted that the shape of such surface portion is substantially cylindrical.

Figure 6:
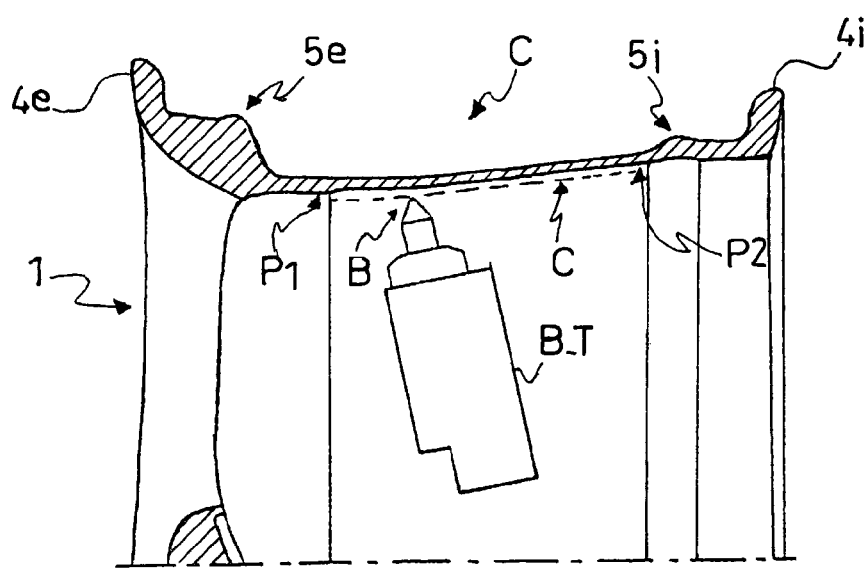

In an alternative embodiment, shown in FIG. 6, the portion of surface of the drop well C subject to burnishing is inside the wheel rim 1 and extends substantially between two points P1 and P2 near to the outer hump 5e and the inner hump 5i respectively. In FIG. 6 the portion of the surface of the drop well C inside the wheel rim 1 and subject to burnishing is indicated by the dotted line Ci.

Figure 7:
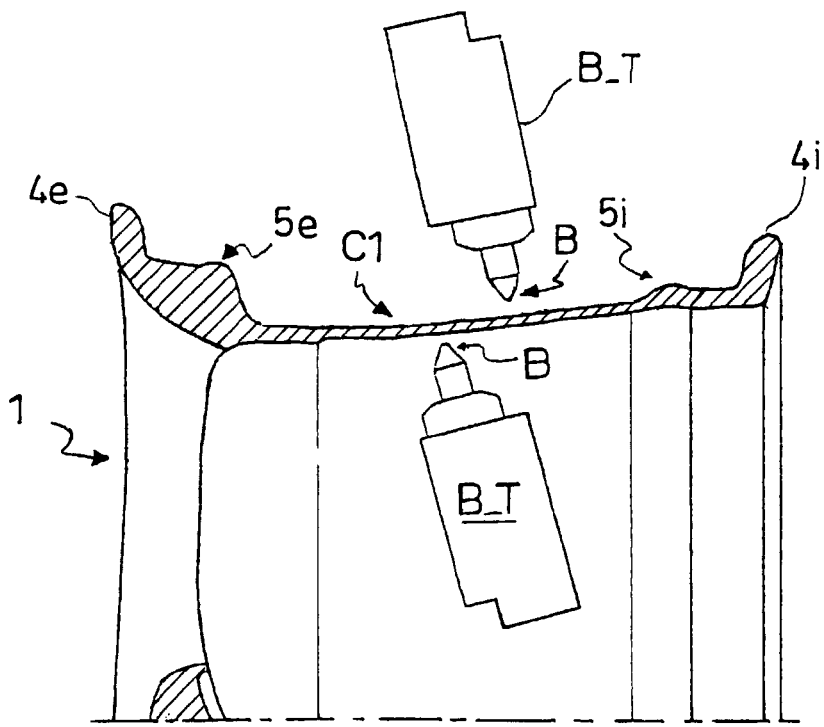

In a further alternative embodiment, shown in FIG. 7, the surface portion of the drop well C subject to burnishing includes a surface portion of the drop well C outside the wheel rim 1 and a portion of surface of the drop well C inside the wheel rim 1. In this case, two burnishing tools B_T may be provided to process the surface portion outside the wheel rim 1 and the surface portion inside the wheel rim 1 respectively. Preferably, but not limitingly, the processing inside and outside of the wheel rim is performed simultaneously, for example with tools that operate on inner and outer surface portions staggered, i.e. not-corresponding, with one another.

Figure 8:
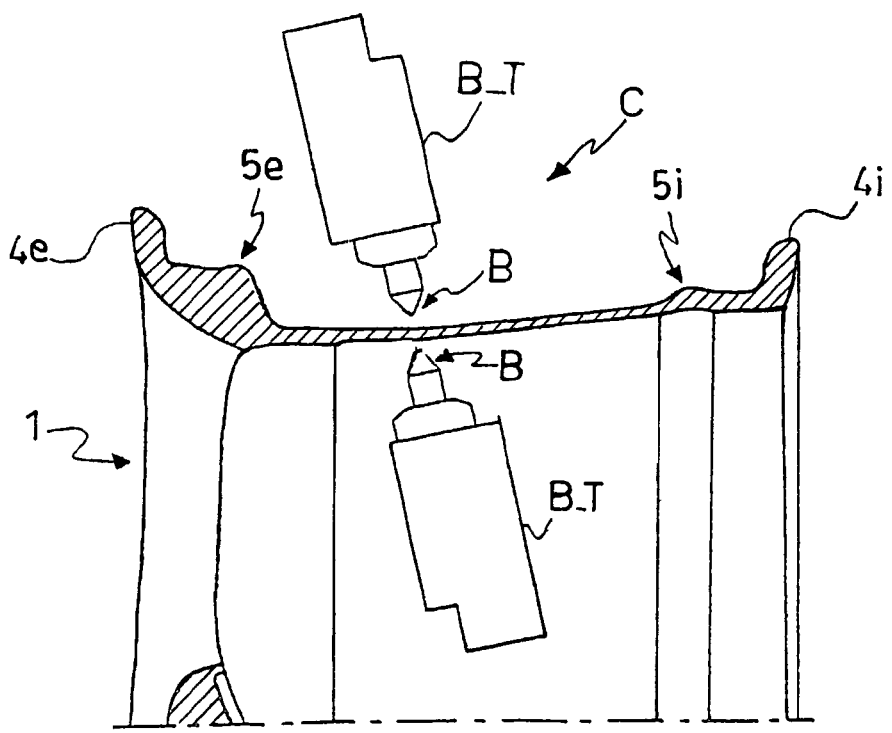

In a further particularly advantageous alternative embodiment, such as represented in FIG. 8, the two burnishing tools operate simultaneously and are counter-posed so as to have the respective compression elements B aligned with one another. In practice, the burnishing tools B_T operate on corresponding zones of the portion of surface inside the drop well and the portion of outer surface of the drop well subject to burnishing.

This last alternative embodiment, presents the uncommon advantage that when a drop well having a very low thickness (for example equal to 2.7 millimetres) is burnished, acting on counter-posed areas of the profile of the drop well, one will be able to operate with burnishing tools with even considerable pressures on the surface Without risking deforming the profile of the drop well.

Returning to the diagram represented in FIG. 3, preferably the manufacture method 20 further includes, a subsequent varnishing operation 26 (VARN_RIM) of the wheel rim, known to those skilled in the art and therefore apparent from the present description.

Advantageously, a manufacturing method in accordance with the present invention allows to obtain an alloy wheel rim with a drop well having a very low thickness compared to that of a wheel rim that can be obtained through a process including the operations of providing a rough wheel rim and processing it at the lathe, as the superficial finishing operation 25 seals any porosities that could cause a passage of air through the section of the drop well. This reduction in thickness allows to obtain a significant reduction in percentage of the weight of the wheel rim, which depends on the dimensions of the wheel rim, and that in some cases is equal to approximately 15%.

Furthermore, a method in accordance with the present invention in order to be actuated requires a very modest economic investment by the manufacturer who already actuates standard methods of the type described above.

Experimental stress resistance tests have proved that wheel rims obtained with a method in accordance with the present invention are able to satisfy performance specifications commonly required by regulations and the market.

Obviously, a man skilled in the art, in order to satisfy contingent and specific requirements, may make further modifications and variants to the manufacturing process according to the present invention, all being within the scope of protection of the invention, as defined in the following claims.

The invention claimed is:

1. Process for the manufacture of an alloy wheel rim comprising the steps of:
   (a) providing a rough light alloy wheel rim having a wheel disc and an annular portion, the annular portion including a first bead and a second bead and defining a drop well having a first profile defining a first thickness, wherein the drop well includes a first hump between the first and second beads arranged in the vicinity of the first bead and a second hump between the first hump and the second bead arranged in the vicinity of the second bead wherein the drop well includes an intermediate portion disposed substantially between the first and second humps, and wherein the intermediate portion extends substantially along the entire width of the drop well of the wheel rim between the first and second humps;
- (b) following step (a), processing the rough wheel rim, by modifying the first profile in order to obtain a second profile having a second thickness which is less than the first thickness of the first profile, only at the intermediate portion of the drop well of the wheel rim, and
- (c) following step (b), subjecting the entirety of a surface of the intermediate portion of the second profile of the drop well of the wheel rim to a superficial surface finishing operation, the superficial surface finishing operation leaving the second thickness of the second profile obtained during step (b) substantially unchanged.

2. The process according to claim 1, wherein the superficial surface finishing operation plastically deforms the surface of the intermediate portion in order to substantially seal any porosities and/or holes present therein.

3. The process according to claim 1, wherein the superficial surface finishing operation includes a number of local compression actions acting on limited areas of the surface.

4. The process according to claim 1, wherein the surface is a surface facing towards the outside of the wheel rim.

5. The process according to claim 1, wherein the surface is a surface facing towards the inside of the wheel rim.

6. The process according to claim 1, wherein the surface includes a first surface facing towards the outside of the wheel rim and a second surface facing towards the inside of the wheel rim, the superficial surface finishing operation being performed by means of at least two tools acting on the first and second surface respectively in a simultaneous way on areas corresponding to the first and second surfaces.

7. The process according to claim 1, wherein the surface includes a first surface facing towards the outside of the wheel rim and a second surface facing towards the inside of the wheel rim, the superficial surface finishing operation being performed by at least two tools acting on the first and second surface respectively in a simultaneous way on zones of the first and second surfaces staggered to one another.

8. The process according to claim 1, wherein the second thickness is less than 4 millimeters.

9. The process according to claim 1, wherein the second thickness is between 2.5 millimeters and 4 millimeters.

10. The process according to claim 1, wherein the second thickness is between 2.5 and 3.5 millimeters.

11. The process according to claim 1, wherein the step of supplying the rough wheel rim includes an in-die casting operation.

12. The process according to claim 1, wherein the step of supplying the rough wheel rim includes a casting operation.

13. The process according to claim 1, wherein step (b) includes a turning operation.

14. The process according to claim 1, wherein the first profile includes an intermediate portion having a first thickness of between 10 millimeters and 20 millimeters.

15. An alloy wheel rim produced according to the manufacturing process of claim 1.

16. The process according to claim 1, wherein the superficial surface finishing operation includes a burnishing operation of the surface.

17. The process according to claim 16, wherein the burnishing operation is performed on the wheel rim by means of at least one tool including a local compression element having a smaller size than the surface.

18. The process according to claim 17, wherein the tool beats the surface several times.

19. Process for the manufacture of an alloy wheel rim comprising the steps of:
- (a) providing a rough alloy wheel rim having an annular portion, the annular portion including a first bead and a second bead and defining a drop well having a first profile having a first thickness, wherein the drop well includes a first hump between the first and second beads adjacent the first bead and a second hump between the first hump and the second bead adjacent the second bead and an intermediate portion extending substantially along the entire width thereof between the first and second humps; and
- (b) following step (a), subjecting the rough wheel rim to a process to remove material from only the intermediate portion of the drop well thereof and produce a second profile at the drop well having a second thickness which is less than the thickness of the first profile.

20. The process according to claim 19 further including following step (b), subjecting the entirety of the surface of the intermediate portion of the second profile of the drop well of the wheel rim to a superficial surface finishing operation, the superficial surface finishing operation leaving the second thickness of the second profile obtained during step (b) substantially unchanged.

21. An alloy wheel rim produced according to the manufacturing process of claim 19.

* * * * *